US006421355B1

United States Patent
Quiring et al.

(10) Patent No.: US 6,421,355 B1
(45) Date of Patent: *Jul. 16, 2002

(54) METHODS AND LINECARD DEVICE FOR ALLOCATING MULTIPLE TIMESLOTS OVER DIGITAL BACKPLANE

(75) Inventors: Keith L. Quiring, Dallas; Alan Gatherer, Richardson; Ray A. King, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/107,065

(22) Filed: Jun. 29, 1998

Related U.S. Application Data (60) Provisional application No. 60/071,993, filed on Jan. 20, 1998.

(51) Int. Cl.[7] .................................................. H04J 3/16
(52) U.S. Cl. ........................ 370/468; 370/437; 375/222
(58) Field of Search ................................. 370/230, 235, 370/236, 352, 458, 465, 468, 470, 471, 473, 474, 485, 480, 395.2, 395.21, 463, 437, 419; 375/222

(56) References Cited

U.S. PATENT DOCUMENTS

| 5,426,640 | A | * | 6/1995 | Hluchyj et al. ............. 370/94.1 |
| 6,044,107 | A | * | 3/2000 | Gatherer et al. ............. 375/222 |
| 6,055,571 | A | * | 4/2000 | Fulp et al. .................. 709/224 |

* cited by examiner

Primary Examiner—David Vincent
(74) Attorney, Agent, or Firm—J. Dennis Moore; W. James Brady, III; Frederick J. Telecky, Jr.

(57) ABSTRACT

A linecard codec (250) permitting an increased throughput connection between a subscriber modem (20) and a service provider coupled to a digital backplane (150). The linecard codec (250) includes an analog interface (152) to the Public Switched Telephone Network, a digital interface (119) to the digital backplane (150), conversion circuits (258, 280) interspersed between the analog interface (152) and the digital interface (119), and a controller (340) having a network interface (350) and configured to format requests for bandwidth and transmit them to a network administrator of the digital backplane (150). A code recognition mechanism (272) is used to monitor the Pulse Code Modulated (PCM) signals from service providers and in combination with control logic (300) and the controller (340) provides a way to allocate and deallocate timeslots on the digital backplane (150).

8 Claims, 4 Drawing Sheets

METHODS AND LINECARD DEVICE FOR ALLOCATING MULTIPLE TIMESLOTS OVER DIGITAL BACKPLANE

This application claims priority under 35 USC § 119(e)(1) of provisional application Serial No. 60/071,993 filed Jan. 20, 1998, and relates to application Ser. No. 09/103,496 filed Jun. 24, 1998, entitled "Central Office Line Card with Code Recognition for Increasing Data Rates Over PSTN" the entirety of which are incorporated herein by reference.

TECHNICAL FIELD

The invention relates generally to data communications and more particularly to high speed data transmissions over the public switched telephone network.

BACKGROUND OF THE INVENTION

The sudden popularity of the Internet as a communication tool has led to an intense push for higher data transmission rates over the Public Switched Telephone Network (PSTN). As a result, the demand for increased data transmission rates over analog twisted pair wiring is at an all time high. The most recent widespread standard is "56K" analog modem technology developed by U.S. Robotics and Rockwell/Lucent. While these technologies will not generate true 56 kbps performance under typical subscriber line conditions, they do provide a boost in performance from the previous standard of bidirectional 33.6 kbps.

Theoretically, a connection of 64 kbps should be attainable between the subscriber and the Internet Service Provider (ISP) via a standard Plain Old Telephone Service (POTS) connection. This is because 64 kbps is the rate at which data is transferred from the Central Office (CO) linecard to the ISP or other remote terminal. Several factors prevent this from happening including imperfect line conditions and varying local loop lengths common to POTS analog networks. The primary reason, however, for this less than the theoretical transmission rate is that the PSTN was designed to carry voiceband frequencies in the range of 300–3.4 KHZ.

With the advent of digital voice systems, the decision was made to use a "companded" (compressed/expanded) data to reduce the number of bits per digital sample from a nominal 13-bits to 8-bits. Companding schemes use higher resolution at low signal amplitudes and lower resolution at high amplitudes. Companded signals are suitable for voice frequencies but not for analog modems since they limit their apparent bandwidth to a ceiling of 33.6 kbps upstream and 56 kbps downstream. In practice, most analog modems are only able to achieve rates of 46–48 kbps downstream due to less-than-perfect analog line conditions.

The Analog-to-Digital ("A/D") portion of the linecard codec is where the analog signal is converted to its 8-bit companded representation. Hence, the linecard codec acts as a bottleneck in the entire data communications chain. One way of avoiding this bottleneck is by removing the A/D conversion in the downstream direction. This is accomplished by requiring a digital connection between the provider and its CO and increasing the data throughput of the modem signals to capitalize on the extra capacity.

Moreover, while the use of 56K standards results in downstream data throughput of 56 kbps under ideal local loop conditions, the upstream direction must still contend with an A/D conversion into 8-bit companded data and is still limited to 33.6 kbps. Imperfect conditions in the analog local loop further degrade the signal resulting in less than the 56/33.6 kbps maximums.

Additionally, while 56K standards offer improvements over the older V.34+ standard, bandwidth is still needed to keep pace with upcoming technologies such as video conferencing, remote server access, and others high rate transmission protocols. If higher data throughput is to be achieved, the limitations in the CO need to be overcome. Overhauling the PSTN by replacing the 8-bit companded data scheme could solve the problem, but this is not a feasible solution since the cost of such as effort would be enormous.

SUMMARY OF THE INVENTION

The invention overcomes a limitation in bandwidth of prior communications standards including 56K by offering increased downstream rates using an analog modem communicating over the PSTN.

Disclosed in one embodiment, is a method of requesting bandwidth on a digital communications channel. The method comprises the steps of determining the present data communications activity occurring over the digital communications channel and then calculating the bandwidth requirements of the channel based on the present data communications activity. Next, a predefined code pattern is formatted containing a bandwidth request and transmitted to the central office. The central office linecard codec decodes the code pattern to reveal the bandwidth request and, in turn, transmits the request to a third party administrator of the digital communications channel.

According to another embodiment, a method of requesting multiple timeslots for communications over a digital backplane is further disclosed. The method is used in combination with a central office linecard that permits communications from a modem coupled to the Public Switched Telephone Network (PSTN) to a service provider. The method comprises the steps of establishing a voice call between the modem and the central office linecard and negotiating a communications link between the service provider and the subscriber modem. A command code is transmitted to the linecard and the linecard is disconnected from the communications link with the subscriber modem. Next, a code pattern containing a request for timeslots is transmitted to the linecard which, in turn, is transmitted to a third party administrator of the digital backplane.

Also disclosed is a method of de-allocating unused timeslots. In one embodiment, when the service provider has determined that a multiple-timeslot connection has been idle for a period of time, it transmits a code to the subscriber modem requesting a move to a lower rate protocol such as V.34. Upon successful transition, a predefined code pattern is transmitted to the CO linecard codec from the service provider. The linecard codec, recognizing the code pattern, initiates a move back to "voice" mode, releasing the extra timeslots allocated to it. The linecard codec can then move back into "data" mode when more timeslots are required.

Further disclosed is an improved linecard codec supporting multiple timeslots on a digital backplane. The linecard permits increased data rates between a subscriber and a service provider over the PSTN. In one embodiment, the linecard comprises an analog interface coupled to the PSTN, a digital interface coupled to a digital backplane used by at least one service provider, a conversion circuit interspersed between the analog interface and the digital interface, and a controller circuit coupled to the digital interface and configured to request multiple timeslots from a third party administrator of the backplane.

According to another embodiment, the linecard codec incorporates an input register that receives requests for timeslot allocation from the service provider. Code patterns from the service provider are decoded by the linecard codec which, in turn, formats a request for bandwidth. The linecard codec allows the backplane to temporarily revert to "voice" mode during periods of inactivity. This causes more efficient use of the communication network. Since a large portion of the time spent during common Internet access is inactive, the total data rate is increased.

According to another embodiment, the linecard codec contains a code recognition mechanism that provides a way to dynamically allocate and deallocate timeslots during data communications. A certain amount of intelligence is employed in the code recognition mechanism to handle simple handshaking and act on the code pattern received from the service provider. The general instruction architecture places the service provider in the master position and the linecard codec in the slave position.

According to another embodiment, the linecard codec incorporates the control logic responsible for formatting requests for more or less timeslots and transmitting then to the network administrator. During periods of inactivity, the timeslots are deallocated to make room for other connections on the same backplane.

According to another embodiment, the linecard codec includes a strobe terminal that permits sending interrupts to the linecard microcontroller for "on-the-fly" timeslot allocation.

A technical advantage of the invention is that it provides the subscriber with much more bandwidth than currently available with analog modems while maintaining much of the same equipment and connection methods.

Another technical advantage of the invention is that it permits replacement of the existing linecard in the CO with the linecard of the present invention enabling hardware and software changes at the CO to provide the increased bandwidth.

BRIEF DESCRIPTION OF THE DRAWINGS

Other aspects of the invention including specific implementations are understood by reference to the following detailed description taken in conjunction with the appended drawings in which.

References in the figures correspond to like numerals in the detailed description unless otherwise indicated.

DETAILED DESCRIPTION OF PREFERRED EMBODIMENTS

Figure 1:
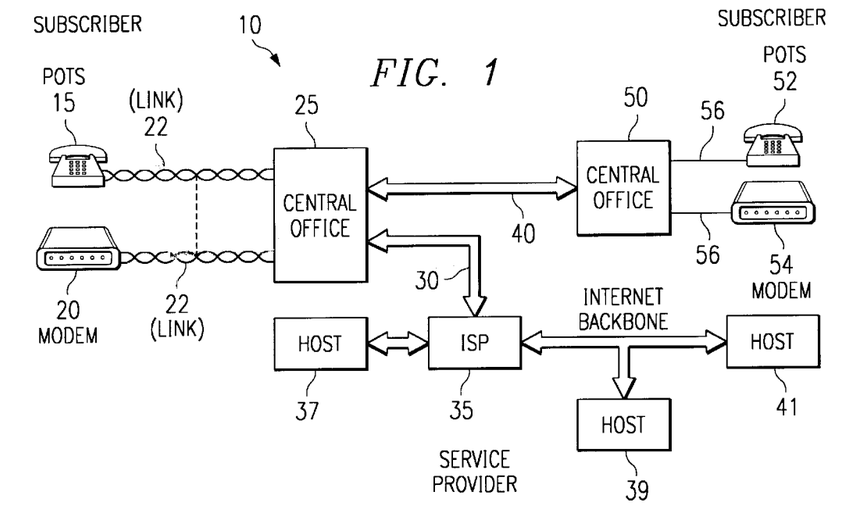
FIG. 1 is a diagram illustrating a communications system wherein the invention can be practiced.

Referring first to FIG. 1, therein is illustrated an example communication systems 10 in which the invention can be practiced according to one embodiment. The communications system 10 includes subscribers and service providers communicating with each other using telecommunications facilities such as those found in the Public Switch Telephone System (PSTN). Typically an individual subscriber has the transmission/reception and data processing equipment enabling access to a service provider.

As shown, a Plain Old Telephone System (POTS) 15 and a modem 20 are coupled to a central office 25 via link 22. Often the link 22 comprises twisted pair wiring of the type used in many PSTN installations. The link 22 may be shared by both the POTS 15 and modem 20 to gain access to the central office 25. This shared configuration is indicated by the dashed line. In other embodiments, the modem 20 and POTS 15 use separate connections to the central office 25.

In operation, the modem 20 transmits and receives analog signals over the communications link 22 to and from the central office 25. The modem 20 is configured to transmit data across the link 22 to other subscribers and to service providers on the communications system 10. The modem 20 also functions as a reception device for receiving information from other subscribers and service providers.

Typically, the modem 20 connects with a the central office linecard (not shown in FIG. 1) in the central office 25. The transmit and receive functions of the modem 20 and the central office 25 can be implemented using known methods and devices. For example, the communications protocol between the modem 20 and the central office 25 may include those supported and standardized by the International Standard Organization, the International Telephone and Telegraph Consultative Committee and the Electronics Industry Association among others.

The POTS 15 is a standard telephone set used by a subscriber in their home, business or other location. Typically, the subscriber can use both the POTS 15 and the modem 20 for both voice and data communications on link 22. A service provider such as Internet Service Provider (ISP) 35 may be accessed by a large number of subscribers of the communications system 10. A dedicated digital connection 30 may be employed between the central office 25 and the ISP 35. Likewise, a communications link 40 is used to couple the near end central office 25 to a far end central office 50 in the system 10. As with link 30, the communications link 40 between the central offices 25 and 50 is usually a high speed digital connection providing bi-directional communications functions between the central offices 25, 50.

As shown, a plurality of host servers 37, 39 and 41 are coupled to the ISP 35 and provide all the information and services available on the communication system 10. The ISP 35 acts as a gateway to the host servers 37, 39, 41 from any one of the subscribers who have access to the ISP 35. Similarly, the central office 25 provides the routing mechanism from an individual subscriber through their modem 20 and on to a service provider 35. The far end central office 50 provides similar functionality for far end subscribers. Thus, the POTS 52 and modem 54 can be used on the far end of the communications system 10 to gain access to a service provider such as ISP 35.

The invention has particular application with respect to the communications data rate between the central offices 25, 50 and the service providers on the communications system 10 such as ISP 35. In particular the invention is directed at a method and device for allocating timeslots on the communications link 30 between the central office 25 and the ISP 35 to increase the data rate of information flowing between subscribers and service providers.

Figure 2:
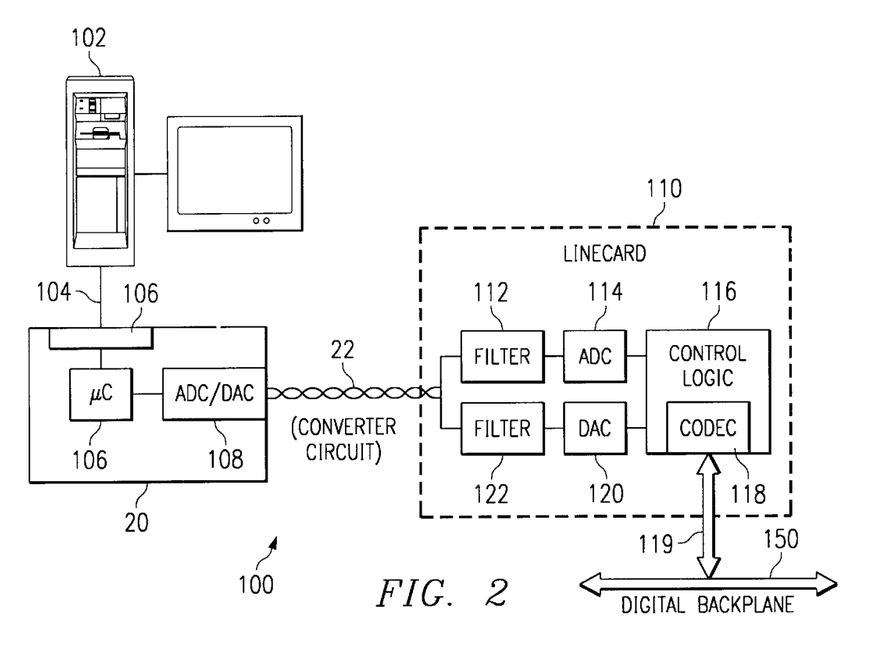
FIG. 2 is a block diagram of subscriber modem coupled to a central office linecard.

In reference to FIG. 2, a block diagram of the modem 20 coupled to a central office linecard 110 is shown and denoted generally as 100. The modem 20 is controlled by the processing system 102 which provides an individual subscriber with the suitable application programs and other resources necessary to cause modem 20 to access the central office 25 via link 22. Data from the processing system 102 is transferred through the interface 104 to modem 20 where it is received in buffer 106 of the modem 20. The buffer 106 may be a universal asynchronous receiver/transmitter or other similar flow control device that handles the communications between the modem 20 and the processing system 102.

As shown, the modem 20 has an internal microcontroller 106 which receives the digital data from the processing system 102 and hands it to the converter circuit 108. In the upstream direction, the converter circuit 108 takes the digital data from the microcontroller 106 of modem 20 and converts it to analog equivalent signals which are modulated and transmitted on link 22 using appropriate modulation rules applicable to the communications protocol employed between the modem 20 and the central office linecard 110. The converter circuit 108 is often a digital-to-analog converter or similar signal processing device.

Thus, analog signals produced by the converter circuit 108 are transmitted on link 22 where they arrive at linecard 110 in the central office 25. Similarly, analog signals are transmitted from the linecard 110 to the modem 20 where they are received by the converter circuit 108 of the modem 20 and converted to their digital bit stream equivalent. As is known by those of ordinary skill various modulation rules can be employed including Quadrature Amplitude Modulation, Trelis Code Encoding, and Frequency Shift Keying among others.

In the upstream direction, analog signals received by the linecard 110 enter the filter 112 which provides the appropriate cut-off filtering functions on the analog input. In some embodiments, the filter 112 is used to prevent aliasing of the Analog-To-Digital Converter (ADC) 114. Next, the filtered signal is converted to a digital bit stream at the ADC 114 and transferred to the backplane 150 by the control logic 116 and digital interface 119. The control logic 116 includes a coder/decoder (codec) 118 which provides the coupling mechanism to the digital backplane 150.

The digital backplane 150 comprises the various facilities including communications mediums (cabling, connectors, etc.) and mechanisms (routers, gateways, transceivers, etc.) employed to provide high rate digital communications between the linecard 110 and other entities on the network. Typically, such facilities are installed, maintained and administrated by a third party administrator such as a long distance company, local exchange carrier or other similar controlling entity. The codec 118 has a digital interface 119 to the digital backplane 150. The fact that the linecard 110 includes the control logic 116 with a codec 118 permits the multiple timeslot request and allocation features of the present invention.

In the downstream direction, data received from other network entities is transmitted on the digital backplane 150 and reaches the digital interface 119 where it is transferred to the Digital-to-Analog Converter (DAC) circuit 120 of the linecard 110. Again, the control logic 116 handles the data transfer functions of the linecard 110. The DAC 120 converts the digital signals from the digital backplane 150 to their equivalent analog counterpart and transmits these analog signals to filter 122 before communicating them in the downstream direction to the modem 20 on link 22. In this manner, the modem 20 is able to transmit and receive information to and from other network entities having access to the digital backplane 150.

According to the invention the digital interface 119 is used to receive requests for bandwidth from service providers. Such requests are received by the control logic 116 via the digital interface 119. The fact that service providers transmit requests for timeslots on the digital backplane 150 enables the multiple timeslot request and allocation features of the present invention.

Figure 3:
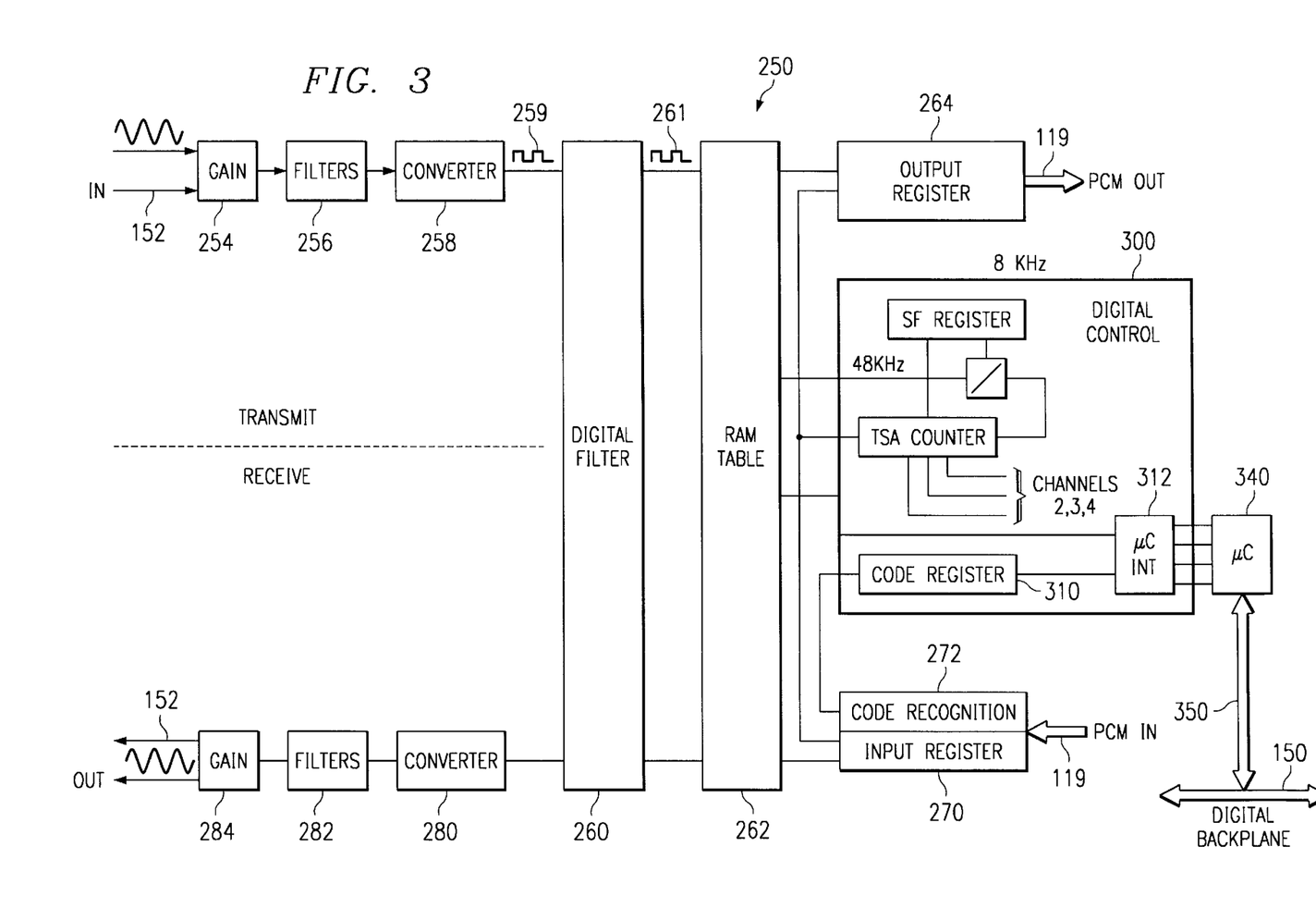
FIGS. 3 is a circuit diagram for a linecard codec according to the invention.

Turning to FIG. 3, a detailed schematic circuit diagram for a linecard codec 250 according to one embodiment of the invention. As is known to those of ordinary skill, linecard codec 250 can be used to provide a signal routing mechanism in a central office 25 between subscribers and service providers. Thus, a central office 25 can replace its existing linecard 110 with the linecard codec 250 to enable increased data rates.

Coding and decoding functions for information transferred between subscribers and service providers are provided by the linecard codec 250. In operation, modulated analog signals enter the linecard codec 250 and reach the gain block 254 through interface 152. The interface 152 is the analog interface of the linecard codec 250. The gain block 254 helps compensate for any line losses which may occur in transmission. After appropriate amplification at the gain block 254, the analog signals are passed through filter 256 which removes extraneous signals outside the voiceband frequencies. In one embodiment, the filter 256 provides a low pass function with a cut-off frequency of approximately 3400 Hz.

The smoothed and filtered analog signal is passed through converter 258 which implements a well known analog to digital conversion function on the signal using the appropriate clock sampling rate. The output of the converter 258 is a digital bit stream sequence 259 which is passed to the digital filter 260 for further digital signal processing. The digital filter 260 may be used to compensate for any loss data bits in the digital signal 259 from the converter 258. Other processing functions may be performed by the digital filter 260 are known to those of ordinary skill.

Next, the digital filtered signal 261 is passed to a Random Access Memory (RAM) table 262 which is used to store a plurality of mapping values sent from the service provider. The fact that mapping values are stored in the RAM table 262 permits a bypass of the limitations of companded code and allows modem manufacturers to employ whatever code distribution they find most effective for their modem protocol. The RAM table 262 can be an optional component which can be eliminated or turned off causing the linecard codec 250 to default to a linear mapping function for data mode operation.

If used, the output of the RAM table 262 reaches output register 264. In other embodiments, the digital filtered signal 261 is transferred to output register 264 directly. The output from the output register 264 are PCM output signals which are transmitted on the digital backplane 150 through the digital interface 119. The transmission protocol and methods used to relay the PCM output signals on the digital backbone 150 are well known.

As shown, PCM signals from the digital backplane 150 are received at input register 270 through digital interface 119. The input register 270 includes a code recognition function 272. The fact that register 270 has a code recognition function 272 enables the multiple timeslot request and allocation features of the present invention.

According to one embodiment, a predetermined code pattern is transmitted by a service provider on the digital backplane 150 which reaches the linecard codec 250 at input register 270. The register 270 decodes the code pattern using the code recognition function 272. When a predetermined code pattern from a service provider is detected, it is loaded into the code register 310 of the codec control logic 300. The control logic 300 performs the control functions of the linecard codec 250 that, among other functions, enable it to recognize requests for timeslots from a service provider.

Once a predetermined code pattern is loaded into code register 310, it sends a strobe to the linecard controller 340 via the microcontroller interface 312. The controller 340 formats a request to the third party network administrator of the digital backplane 150 and transmits the request using network interface 350. Thus, the network interface 350 is used as the medium for requesting bandwidth on the digital backplane 150 from the third party network administrator.

When more timeslots are required for a particular connection, a request is sent through the network interface 350 for additional timeslots on the digital backplane 150, and the linecard codec 250 obtains the number of timeslots allowed to the requesting channel.

When the controller 340 has determined which timeslots in the backplane 150 have been allocated to that line, it programs the linecard codec 250 to transmit and receive data using the assigned timeslots.

In one embodiment, the control logic 300 determines which timeslots in the backplane 150 have been allocated to a particular connection and programs the linecard codec 250 to transmit and receive data using the assigned timeslots. This enable an increased throughput connection. Preferably, the linecard codec 250 sends a confirmation signal to the service provider indicating that it has been configured for an increased throughput connection along with how many timeslots have been allocated.

In one embodiment, the service provider established a connection using the corresponding assigned timeslots and begins sending mapping values to the linecard codec 250 which are stored in the RAM table 262. As mentioned above, the RAM table 262 may be an optional component of the linecard codec 250 according to one embodiment. If present, data from service providers is passed to RAM table 262 and/or the digital filter 260 before reaching the converter 280. The converter 280 converts the digital data to equivalent analog signals using the modulation rules applicable to the communication protocol. The analog signals are filtered by the filter 282 using well known means. The converted and filtered signal passes through the gain block 284 where it is amplified and massaged appropriately and transmitted to the subscriber through interface 152.

Preferably, after the request for multiple timeslots has been transmitted, the linecard codec 250 enters a "multiple timeslot" data mode. In one embodiment, the service provider transmits a predetermined code pattern to the linecard codec 250 indicating that an increased data throughput connection has been achieved and will continue the connection using the increased connection rate over the multiple timeslots assigned by the third party network administrator.

In one embodiment, the linecard codec 250 is in "voice" mode by default, operating in the same manner as any standard POTS 15. This means that the filter 256 passes 300–3400 Hz and the converter 258 samples accordingly using a single timeslot in the backplane 150. When a subscriber initiates a modem connection, the modem creates a low-rate connection with the modem at the service provider that requires only one timeslot.

In another embodiment, the subscriber modem 20 informs the service provider that is wants to establish an increased throughput connection. The subscriber modem 20 waits while the provider sends a predefined code pattern to the linecard codec 250 that interfaces with the subscriber modem 20. The linecard codec 250 is able to recognize this code pattern. Upon receiving the code pattern, it is loaded into the code register 310, and the control logic 300 sends a strobe to linecard controller 340 via interface 312, indicating that an increased throughput connection has been requested. Through the network interface 350 the controller 340 petitions for additional timeslots from the third party network administrator. The network obtains the number of timeslots allowed for that connection and allocates them to the requesting channel.

During much of a typical modem connection, no activity is taking place. For this reason, the methods of the present invention also provide a way to deallocate extra timeslots during periods of inactivity. "Inactivity" is openly defined. It may be defined as any period of non-use that lasts greater than 10 seconds. Alternatively, "activity" could be defined as only occurring during file transfer, and all other times being inactive. With the latter definition, the connection would enter data mode only during file transfer with all other times being inactive. The connection would enter data mode only during file transfers reverting to voice mode at all other times.

In one embodiment, when the service provider has determined that the link 22 has been inactive for a predetermined amount of time, it sends a predetermined code pattern to the linecard codec 250 initiating a throttle-down to a low-rate protocol that requires only one timeslot on the backplane 150. The code pattern is loaded into the code register 310 of the control logic 300. The code register 310 sends a strobe to the controller 340 via interface 312 requesting a switch to "single-timeslot" voice mode. In this mode, only one timeslot is used. To deallocate the secondary timeslots, the control logic 300 interfaces with the network through the controller 340. Once the timeslots have been deallocated, the control logic 300 re-programs the linecard codec 250 for its primary timeslot only. The linecard codec 250 signals the service provider and immediately begins transceiving on the primary timeslot.

A return to "multiple-timeslot" data mode is accomplished in the similar manner as it was during the original establishment of the increased throughput connection. An important difference is that when switching from single-timeslot data mode, the RAM table 262 is not-redownloaded from the provider since the linecard codec 250 continues to use this scheme in the low-rate modem connection. Within a single connection, the protocol may switch between single-timeslot data mode and multiple-timeslot data mode an indefinite number of times. In this way, maximum efficiency over the communications system 10 is achieved.

Figure 4:
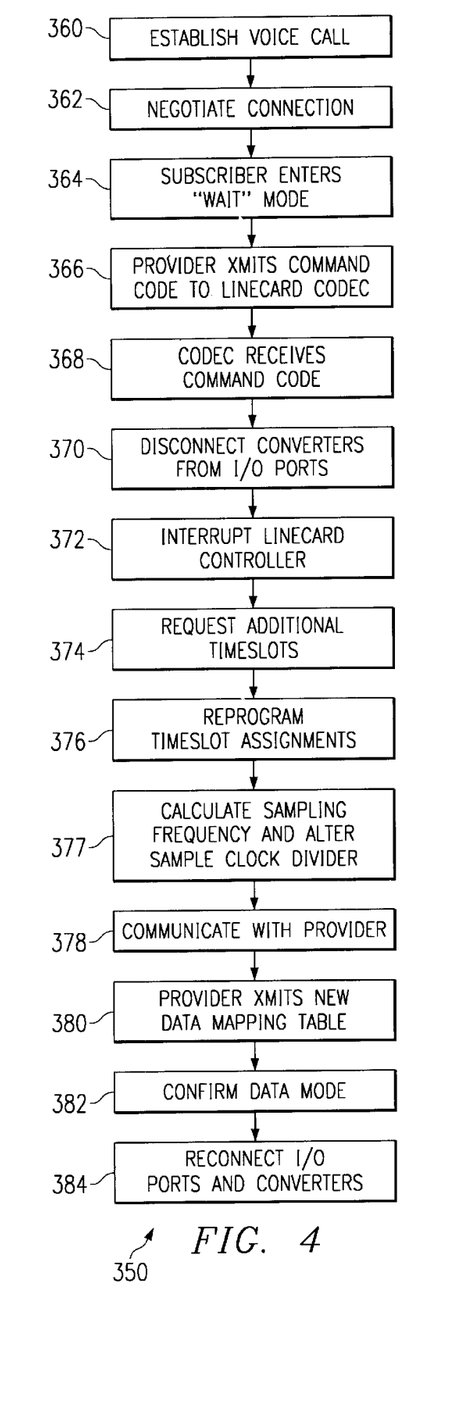
FIG. 4 is a process flow diagram of a method for allocating multiple timeslots according to the invention.

Referring now to FIG. 4, a process flow diagram for establishing a multiple timeslot connection according to one embodiment of the invention is shown and denoted generally as 350. Process 350 commences at step 360 wherein a voice call connection is established between the modem 20 and the central office 25. Typically the connection is established using conventional methods and communications protocols. Next, a communication link between the service provider and the subscriber is negotiated at step 362. In one embodiment, a V.90 connection is established, step 362, although it should be understood that other protocols may benefit from the multiple timeslot allocation features of the present invention. Next, the service provider and subscriber agree to attempt and enhance multiple timeslot connection according to the invention wherein the subscriber modem 20 enters a wait mode at step 364.

At this point the service provider attempts to configure the linecard codec 250 by transmitting a command code at step 366. At step 368, the linecard codec 250 receives the command code and stands ready for a command. At step 370, the linecard codec 250 disconnects the converters 258 and 280 from the interface 152. By doing this, the linecard codec 250 replaces the subscriber modem 20 as the receiving terminal. Using known communication methods, the service provider requests of the linecard codec 250 that the control logic 300 secure multiple timeslots.

As shown, process flow is directed to step 372 wherein the controller 340 is interrupted. Next, the control logic 300 formats a request for a additional timeslots, step 374, from the third party network administrator. Preferably, the administrator's software has been upgraded to respond to such requests. The control logic 300 reprograms timeslot assignments, step 376, based on the number of timeslots on the backplane 150 which have been assigned to the requesting provider.

At this point the control logic 300 calculates the sampling frequency and alters the clock divider according to the number of timeslots that have been assigned, step 378. The linecard codec 250 can then communicate to the provider the number of timeslots it was able to secure, step 380, so that the service provider can make the necessary connections at its end of the call. Knowing the number of timeslots available for the connection, the provider can transmit new mapping values, step 380, to the linecard codec 250.

The linecard codec 250 can store the new mapping values in the RAM table 262, assuming it is employed. Next, the linecard codec 250 confirms that the connections is now in data mode, step 382, and reconnects the interface 152 and converters, step 384, to enable communications between the subscriber modem 20 and the service provider. The fact that the linecard codec 250 reconnects the interface 152 and converters at step 384 after multiple timeslots on the digital backplane 150 have been assigned permits an increased throughput connection according to the invention.

Figure 5:
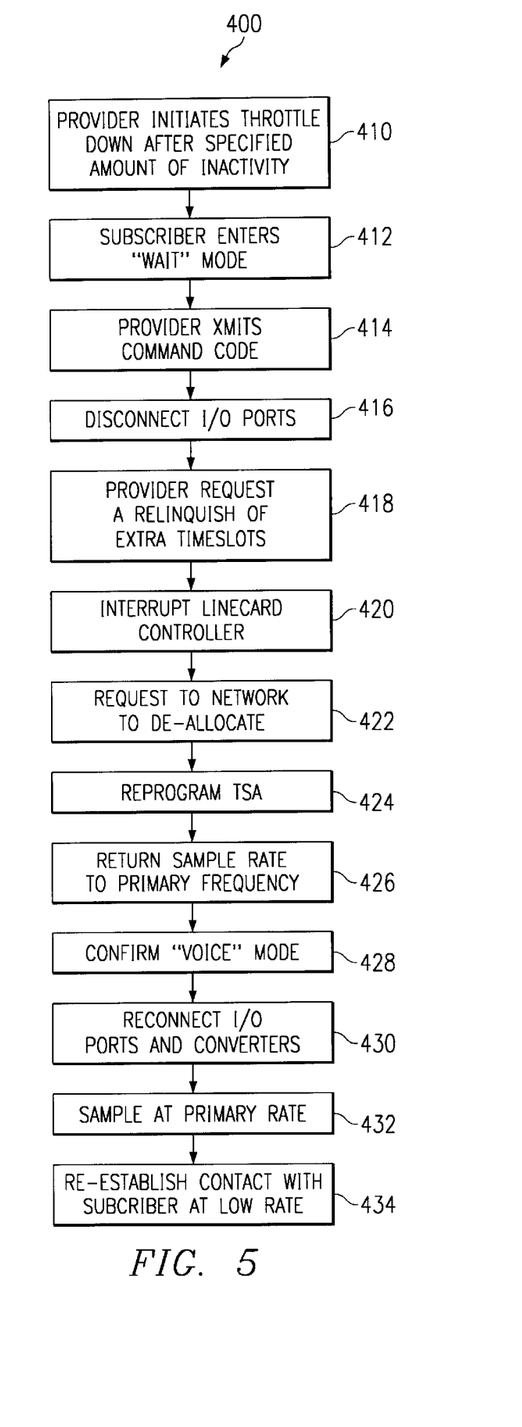
FIG. 5 is a process flow diagram of a method for throttling down to a low-rate connection according to the invention.

Referring to FIG. 5, a process flow diagram for changing from a multiple timeslot connection to a lower rate connection is shown and denoted generally as 400. As before, the subscriber modem 20 and service provider must first agree to throttle down and relinquish timeslots on the backplane 150. Process 400 commences at step 410 wherein the service provider initiates a throttle down after a specified amount of inactivity on the backplane 150. At this point the subscriber enters a wait mode, step 412, and the provider transmits a command code to the linecard codec 250 at step 414.

The linecard codec 250 receives the code and stands by for a command. Next, the linecard codec 250 disconnects the converters 258, 280 from the interface 152, step 416. This places the linecard codec 250 in the position of the subscriber modem 20 in the connection. Using a known communications method the provider requests of the linecard codes 250 that it relinquish the actual timeslots at step 418.

At this point, the linecard codec 250 acts on the instruction by interrupting the controller 340, step 420. The controller, in turn, formats a request to the third party network administrator to deallocate the specified number of timeslots, step 422. Preferably, the network administrator's software has been upgraded to respond to such requests. Process flow is directed to step 424 wherein the linecard codec 250 reprograms timeslot assignments to indicate the use of a single primary timeslot. Next, at step 426, the linecard codec 250 returns to the sample rate of the primary frequency and confirms voice mode operation at step 428.

Process flow is directed to step 430 wherein the linecard codec 250 reconnects the interface 152 and converters 258, 280 to permit the connection between the modem 20 and the service provider to be established. From this point analog signals from the modem 20 are sampled at the rate corresponding to the primary frequency, step 432, as determined at step 426. Finally, the connection with the subscriber modem 20 is reestablished, step 434, at the primary rate corresponding to the low rate connection. The fact that the reconnection to the subscriber modem 20 is made allows a throttle down to a low rate connection according to the invention.

Figure 6:
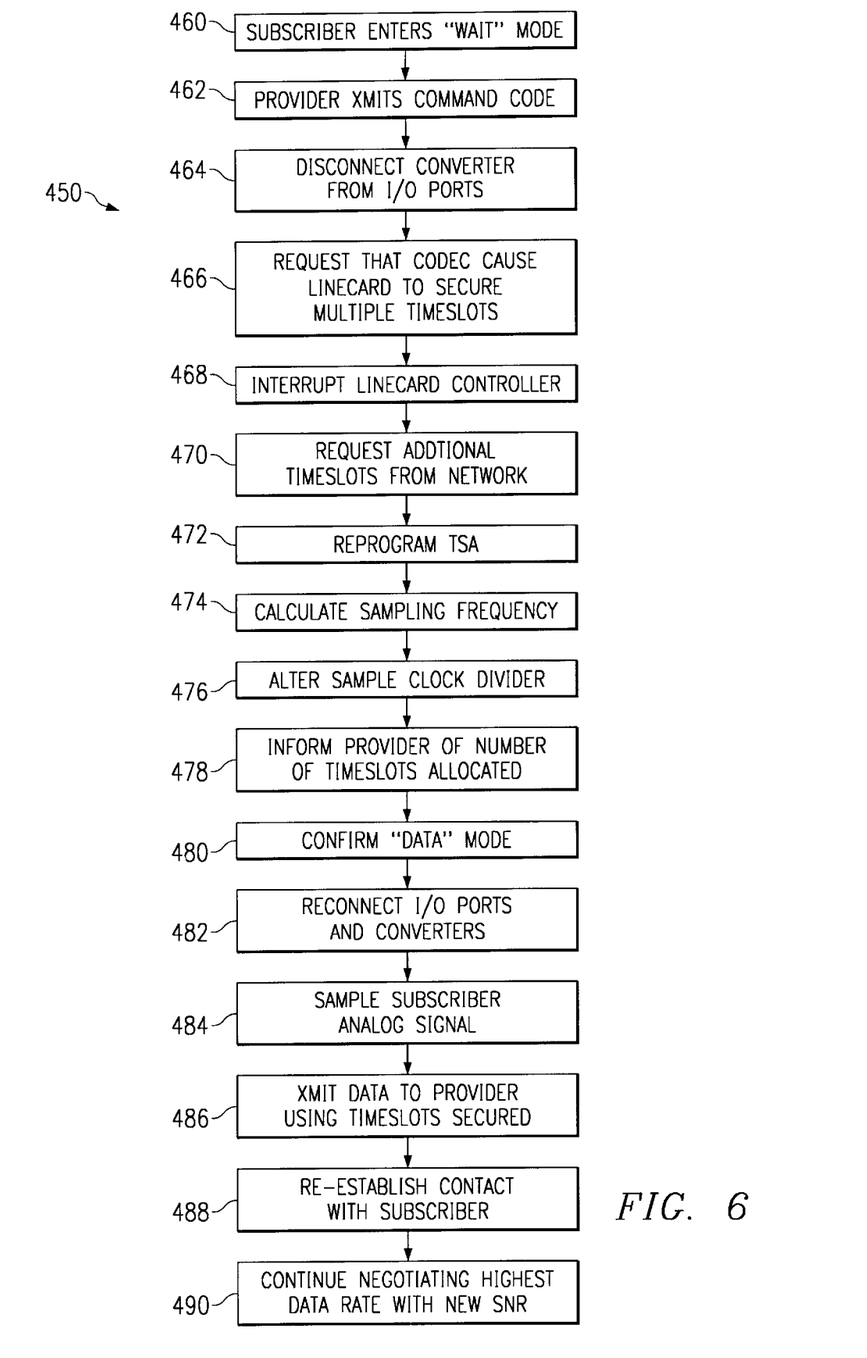
FIG. 6 is a process flow diagram of a method of throttling back up to a multiple timeslot connection according to the invention.

Referring to FIG. 6 a process flow diagram for throttling back up to a multiple timeslot connection according to the invention is shown and denoted generally at 450. Process 450 is initiated only after the subscriber modem 20 and service provider agree to attempt a multiple timeslot connection. At step 460 the subscriber modem 20 enters a wait mode. Next, at step 462, the provider transmits a command code to linecard codec 250 which, in turn, receives the code and stands by for a command. In the process the linecard codec 250 disconnects the converters 258, 280 from the interface 152 as indicated in step 464.

Using a known communications method the provider requests that the linecard codec 250 secure multiple timeslots at step 466. The linecard codec 250 acts on the instruction by sending an interrupt to the controller 340 at step 468. Next, the request is transmitted to the network administrator, step 470, who allocates the number of timeslots available for that request. Preferably the software of the network administrator has upgraded to respond to such requests.

Process flow is directed to step 472 wherein the controller 340 reprograms timeslot assignments on the linecard codec 250 to indicate which timeslots on the backplane 150 it now owns. Knowing how many timeslots have been assigned, the linecard codec 250 calculates the proper sampling frequency, step 474, and alters the sample clock divider at step 476. In this way the master clock is converted to the sampling clock. Next, the linecard codec communicates to the provider which timeslots it was able to secure, step 478, and confirms that the connections is now in data mode as indicated in step 480. At this point, process flow is redirected to step 482 wherein the linecard codec 250 reconnects the interface 152 and converters 114, 120 allowing a connection between a subscriber modem 20 and the service provider to be established.

As indicated at step 488, all analog signals from the subscriber modem 20 are sampled using the rate calculated at step 476. Thus, the data from the subscriber modem 20 is transmitted to the provider using the timeslots secured, step 486, and the interface 152 with subscriber is re-established, step 488.

The connection between the subscriber modem 20 and the central office 25 now becomes the bottleneck in the communications system. Accordingly, in one embodiment the central office 25 and subscriber modem 20 continue to negotiate the highest data rate possible, step 490, given the new signal to noise ratio achieved through the allocation of multiple timeslots.

In one embodiment, the output of the converter 280 in the linecard codec 250 is buffered by a dept equal to the number of timeslots in use. This is because 32 timeslots (given a 2.048 MHZ backplane; could be up to 128 timeslots 8.192 MHZ backplane) occur during the time period in which a single timeslot occurred in the low rate connection. Thus, in one embodiment the linecard codec 250 can be using up to 6 of timeslots and data is sampled 6 times during the time period in which only a single sample was previously taken. If the signals are sampled at an equidistant intervals, the timeslots could occur sequentially meaning that all 6 data words are available almost simultaneously.

While the invention has been described in conjunction with preferred embodiments, it should be understood that modifications will become apparent to those of ordinary skill in the art and that such modifications are intended to be included within the scope of the invention and the following claims.

What is claimed is:

1. A method for a subscriber modem connected to a central office to request bandwidth on a digital communications channel configured as a data channel between a service provider and a central office, the method comprising the steps of:

transmitting a request for bandwidth from the subscriber modem to the service provider;

formatting a predetermined code pattern with a bandwidth request at the service provider;

transmitting the predetermined code pattern from the service provider to the central office;

decoding the predetermined code pattern at the central office to determine the bandwidth request;

transmitting the bandwidth request to a controller of the digital communications channel; and allocating, at the central office, a bandwidth to the digital communications channel.

2. The method according to claim 1 wherein the step of decoding the predetermined code pattern includes the further step of interrupting any communications between the service provider and the central office.

3. The method according to claim 1 further comprising the step of transmitting data from the service provider to the central office using a data rate supported by the bandwidth request contained in the predetermined pattern.

4. The method according to claim 1 wherein the step of allocating a bandwidth is performed by allocating a single timeslot on the digital communications channel.

5. The method according to claim 1 wherein the step of allocating a bandwidth is performed by allocating a plurality of timeslots on the digital communications channel.

6. In combination with a central office linecard that permits communications from a modem coupled to the Public Switched Telephone Network (PSTN) to a service provider, the linecard having an analog interface the PSTN and a digital interface to a digital backplane coupling at least one service provider to the central office linecard, the digital backplane administered by a controller, a method of requesting timeslots over the digital backplane comprising the steps of:

establishing a voice call between the modem and the central office linecard;

negotiating a communications link between the service provider and the subscriber modem;

transmitting a request for bandwidth from the subscriber modem to the service provider;

responsive to receiving said request, transmitting a command code representing a request to configure the linecard from the service provider to the linecard;

disconnecting the linecard from the communications link with the subscriber modem;

transmitting a predetermined code pattern continuing a request for timeslots from the service provider to the linecard for multiple timeslots;

transmitting the request to the controller;

configuring the linecard to provide multiple timeslots assigned to the service provider; and reconnecting the linecard to the communications link with the subscriber modem.

7. The method according to claim 6 further comprising the step of communicating to the service provider the number of timeslots assigned.

8. The method according to claim 7 further comprising the step of transmitting new data mapping values to the central office linecard according to the number of timeslots assigned.

\* \* \* \* \*